(12) United States Patent
Shankar et al.

(10) Patent No.: US 8,356,014 B2
(45) Date of Patent: Jan. 15, 2013

(54) REFERRING TO PARTITIONS WITH FOR (VALUES) CLAUSE

(75) Inventors: Shrikanth Shankar, San Francisco, CA (US); Ananth Raghavan, San Francisco, CA (US); Badhri G. Varanasi, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 822 days.

(21) Appl. No.: 11/764,129

(22) Filed: Jun. 15, 2007

(65) Prior Publication Data
US 2008/0313133 A1    Dec. 18, 2008

(51) Int. Cl.
*G06F 7/00* (2006.01)
(52) U.S. Cl. .............. 707/665; 707/668; 707/802
(58) Field of Classification Search ........ 707/2, 3, 707/100, 781, 665, 668, 802; 709/225
See application file for complete search history.

(56) References Cited

U.S. PATENT DOCUMENTS

| | | | |
|---|---|---|---|
| 5,960,194 A * | 9/1999 | Choy et al. ....................... 1/1 |
| 6,002,866 A | 12/1999 | Fuller |
| 6,003,036 A | 12/1999 | Martin |
| 6,341,289 B1 * | 1/2002 | Burroughs et al. .......... 707/737 |
| 6,405,198 B1 | 6/2002 | Bitar et al. |
| 6,867,991 B1 * | 3/2005 | Tezcan et al. ............. 365/49.16 |
| 7,143,091 B2 | 11/2006 | Charnock et al. |
| 7,143,105 B2 | 11/2006 | Nakano et al. |
| 7,146,377 B2 | 12/2006 | Nowicki et al. |
| 7,334,002 B2 | 2/2008 | Byrne |
| 7,356,549 B1 | 4/2008 | Bruso et al. |
| 7,395,402 B2 | 7/2008 | Wilson et al. |
| 7,406,499 B2 | 7/2008 | Singh et al. |
| 7,447,839 B2 | 11/2008 | Uppala |
| 7,457,832 B2 | 11/2008 | Baird et al. |
| 7,483,981 B2 * | 1/2009 | Weinert et al. ............... 709/225 |
| 7,617,370 B2 | 11/2009 | Jernigan et al. |
| 7,676,514 B2 | 3/2010 | Faibish et al. |
| 7,698,334 B2 | 4/2010 | Kazar et al. |
| 7,716,420 B2 | 5/2010 | Gole et al. |
| 7,716,448 B2 | 5/2010 | Schneider |

(Continued)

OTHER PUBLICATIONS

Oracle Corporation, Oracle8 Concepts Release 8.0 A58227-01, 9 Partitioned Tables and Indexes, http://download-east.oracle.com/docs/cd/A58617_01/server.804/a58227/ch_pti.htm#436962, printed Sep. 26, 2007, pp. 1-31.

(Continued)

*Primary Examiner* — Pierre Vital
*Assistant Examiner* — Christopher J Raab
(74) *Attorney, Agent, or Firm* — Hickman Palermo Truong Becker Bingham Wong LLP; Karl T. Rees

(57) ABSTRACT

A method and apparatus for referencing a partition of a data storage space in a request to perform an operation with relation to the partition are disclosed. The techniques disclosed do not rely on knowing the partition's name, thus simplifying the process of requesting a database to perform an operation on a partition when that partition's name is unknown. Data such as a DDL statement is received. The data indicates a value in a FOR clause in lieu of the partition name. The data also indicates an operation to be performed with respect to a particular partition of the partitioned space. The particular partition is not named in the received data. Based on the value, it is determined that the particular partition is a first partition. The operation is performed with respect to the first partition.

32 Claims, 2 Drawing Sheets

U.S. PATENT DOCUMENTS

| | | | |
|---|---|---|---|
| 7,774,329 B1* | 8/2010 | Peddy et al. | 707/705 |
| 7,890,541 B2 | 2/2011 | Teng et al. | |
| 7,949,865 B1 | 5/2011 | Yadav | |
| 8,126,870 B2* | 2/2012 | Chowdhuri et al. | 707/713 |
| 2002/0035514 A1* | 3/2002 | Whitley et al. | 705/26 |
| 2004/0260671 A1 | 12/2004 | Potter et al. | |
| 2004/0267782 A1 | 12/2004 | Nakano et al. | |
| 2005/0187897 A1 | 8/2005 | Pawar et al. | |
| 2006/0004886 A1 | 1/2006 | Green et al. | |
| 2006/0053163 A1* | 3/2006 | Liu et al. | 707/104.1 |
| 2006/0206507 A1* | 9/2006 | Dahbour | 707/100 |
| 2006/0218123 A1* | 9/2006 | Chowdhuri et al. | 707/2 |
| 2006/0253431 A1* | 11/2006 | Bobick et al. | 707/3 |
| 2007/0239793 A1 | 10/2007 | Tyrrell et al. | |
| 2007/0260842 A1 | 11/2007 | Faibish et al. | |
| 2008/0091690 A1 | 4/2008 | Ellersick et al. | |
| 2008/0104359 A1 | 5/2008 | Sauer et al. | |
| 2008/0114749 A1 | 5/2008 | Chandhok et al. | |
| 2008/0140937 A1* | 6/2008 | Nalawade et al. | 711/119 |
| 2008/0215544 A1* | 9/2008 | Galindo-Legaria et al. | 707/3 |
| 2008/0228829 A1 | 9/2008 | Crutchfield et al. | |
| 2008/0256029 A1 | 10/2008 | Abrink | |

OTHER PUBLICATIONS

Oracle Corporation, Oracle® Database Concepts 10g Release 1 (10.1) Part No. B10743-01, 18 Partitioned Tables and Indexes, http://download-east.oracle.com/docs/cd/B14117_01/server.101/610743/partconc.htm, printed Sep. 26, 2007, pp. 1-16.

Oracle Corporation, Oracle® Database Administrator's Guide 10g Release 1 (10.1) Part No. B10739-01, 16 Managing Partitioned Tables and Indexes, http://download-east.oracle.com/docs/cd/B14117_01/server.101/b10739/partiti.htm, printed Sep. 26, 2007, pp. 1-62.

* cited by examiner

REFERRING TO PARTITIONS WITH FOR (VALUES) CLAUSE

FIELD OF THE INVENTION

The present invention relates to data storage and, more particularly, referencing partitions of a data storage space when the name of the partition is unknown.

BACKGROUND

Data stored on a computer system is typically arranged into one or more data storage spaces. Collectively, these data storage spaces are often referred to as a database. Each data storage space comprises one or more data items. Data items in a particular space share common characteristics. A data item may have a value for each of these characteristics. For example, relational databases store data in a number of spaces known as tables. The data items in each table, forming the "rows" of the table, share the same "columns" of data, in that for each column of data, any item in the table may have a value.

It is helpful to partition data storage spaces for administrative purposes such as archiving, caching, enhancing performance, copying or deleting data, and free space management. For example, spaces that store data items with date characteristics are often partitioned so that each partition comprises only those items that pertain to a particular range of dates. One partition, for example, might only store data items pertaining to a particular month. Another partition might only store data items that pertain to a particular fiscal quarter. Since a partition also comprises data items that share common characteristics, a partition may also be considered a data storage space.

The determination of to which, if any, partition a data item pertains is made by looking up one or more of the data item's values in a partition mapping. The partition mapping maps certain sets or ranges of values to certain partitions. These sets or ranges of values correspond to one or more characteristics shared by the data items in the partitioned storage space. These characteristics are known as partitioning characteristics. For tables, these sets or ranges of values may correspond to the value of a particular column upon which the partition mapping is said to be based. This column is known as the partitioning column. For example, a partition mapping for a table might be based upon the value of a data item's date column. The mapping could define ranges of dates, such as months or years. Each range could pertain to a separate partition. To determine the partition to which a new data item pertains, one would determine under which of the defined ranges the value of the item's date column fell. Partition mappings may be based on multiple partitioning columns, which is often the case with subpartitions. Partition mappings may also be based on a variety of other characteristics, such as whether a data item pertains to a particular range of numbers or set of discrete values.

It is often useful to reference a particular partition in order to perform operations with relation to the particular partition. For example, database administrators often drop partitions using a DDL statement such as the one below:
    ALTER TABLE tablename DROP PARTITION partitionname;
It is useful to reference a particular partition for a variety of other operations known within the art, such as modifying, splitting, or joining the partition.

Existing techniques for referencing a partition are problematic in that they require knowledge of the partition's name. For example, in the ALTER TABLE statement above, it was necessary to know that the partition was named partitionname. A partition's name is often unknown for a number of reasons. First of all, the partition may have been created by a person other than the person seeking to perform an operation on the partition. Second, the person who created the partition may have forgotten the partition's name. Third, partitions are often automatically assigned a name by the database system instead of by a person. This automatic assignment makes a partition's name difficult to predict.

According to existing techniques, this problem is overcome by querying the database system for a partition's name prior to referencing the partition in desired operation. This workaround is inefficient, especially when developing scripts or applications that automatically manage the partitions in the database.

A method of referencing a partition in a request to perform an operation with respect to that partition that does not rely on knowing the partition's name is therefore desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques for referencing a partition of a data storage space in a request to perform an operation with respect to the partition are disclosed. The techniques do not rely on knowing the partition's name, thus simplifying the process of requesting a database system to perform an operation on a partition when that partition's name is unknown.

According to one embodiment, data such as a data definition language (DDL) statement is received. The data indicates a value. The data also indicates an operation to be performed with respect to a particular partition of the partitioned space. The particular partition is not named in the received data. Based on the value, it is determined that the particular partition is a first partition. The operation is performed with respect to the first partition.

According to one embodiment, data is sent to a database system. The data indicates a request for an operation to be performed with respect to a partition of a partitioned space within the database system. The statement identifies the partition by indicating a first value that is not a name. The partition can be uniquely identified by the first value because the first value is mapped to the partition under the space's partition mapping.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example Process Flow

Figure 1:
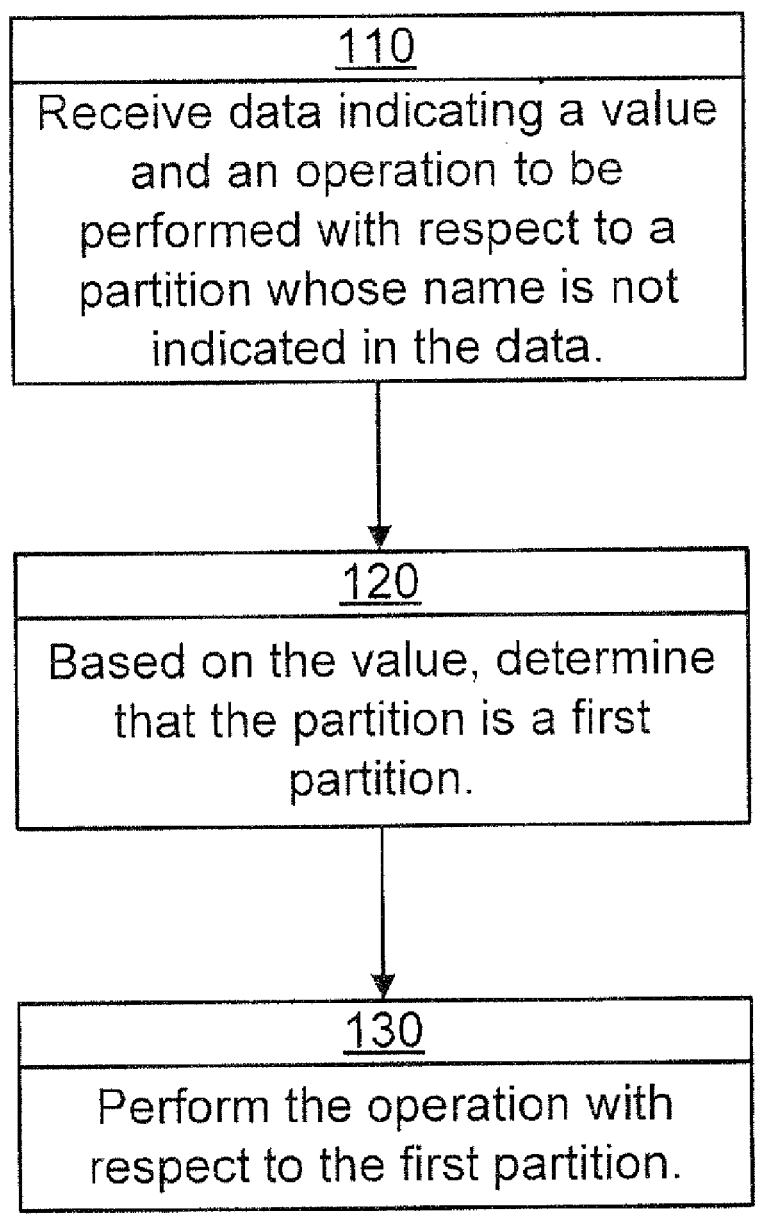
FIG. 1 is a flowchart illustrating the process of referencing a partition when the partition's name is unknown, according to an embodiment of the invention.

FIG. 1 is a flowchart illustrating the process of referencing a data item when a partition's name is unknown according to an embodiment of the invention.

In step 110, data is received at a database system. The data indicates a value. The data also indicates an operation to be performed with respect to a particular partition of the partitioned space. The particular partition is not named in the received data. Formats for indicating an operation in data sent to a database system are well-known in the art, including DDL, data manipulation language (DML), and other structured query language (SQL) statements. Any format for indicating a value in data sent to a database system may be used to indicate the value. According to one embodiment, the value is indicated in a FOR clause used in lieu of a partition name in standard DDL statements. For example, the following statement may be used:

ALTER TABLE tablename DROP PARTITION FOR (15-jan-2006);

Instead of identifying the partition by the partition name, the FOR (15-jan-2006) clause is used to identify the partition, with '15-jan-2006' being the value indicated.

In step 120, based on the value, it is determined that the particular partition is a first partition. This determination may be made by looking up the value indicated in the data of step 110 in the partition mapping. For example, consider a partition mapping that mapped ranges of dates to partitions. If the ranges corresponded to calendar months, the value indicated in the example statement above, '15-jan-2006,' would be determined to pertain to the partition for January 2006. Thus, it would be determined that the particular partition indicated by the statement above would be the partition for January 2006.

In step 130, the operation is performed on the first partition. For example, in response to the example statement above, the partition for January 2006 would be dropped from the partitioned storage space.

The technique described above may be applied to any type of partitioned storage space in any type of database system. The techniques may also apply to any data indicating a request to perform an operation on a partition. Any type of value may be indicated, as long as the partition mapping is based on that type of value.

By facilitating the identification of a partition by a value that may be mapped to that partition, the technique described above greatly simplifies the process of requesting that a database system perform an operation on a partition when that partition's name is unknown. One may merely send data to the database system indicating (a) the desired operation and (b) a value that is mapped to the partition in the partition's partition mapping.

Subpartitions

The techniques described above may also be extended to subpartitions of a data storage space by indicating multiple values in the data received by the database system in step 110, each value corresponding to different sets or ranges of values in the partition mapping. The different sets or ranges of values, in turn, pertain to different partitioning characteristics. A convention may be used to designate which value pertains to which set or range of values. For example, assuming that the partitioning is hierarchical, the first indicated value would correspond to the set or range pertaining to the first partitioning characteristic for the partition, and the second indicated value would correspond to the set or range pertaining to the second partitioning characteristic.

Data received by the database system indicating multiple values may be in any format. According to one embodiment, the value is indicated in a FOR clause used in lieu of a partition name in standard DDL statements. For example, the following statement may be used:

ALTER TABLE tablename DROP SUBPARTITION FOR (15-jan-2006, 10917);

Using the partition mapping as explained in step 120, the values indicated above will be determined to pertain to a subpartition in the partition for January 2006. Specifically, the subpartition will be determined to be the subpartition for the range encompassing the value 10917 (e.g. 10000-19999). Thus the operation will be performed on this subpartition.

This technique may be extended multidimensionally to subpartitions partitioned upon any number characteristics. One may simply increase the number of values indicated in the data.

Hardware Overview

Figure 2:
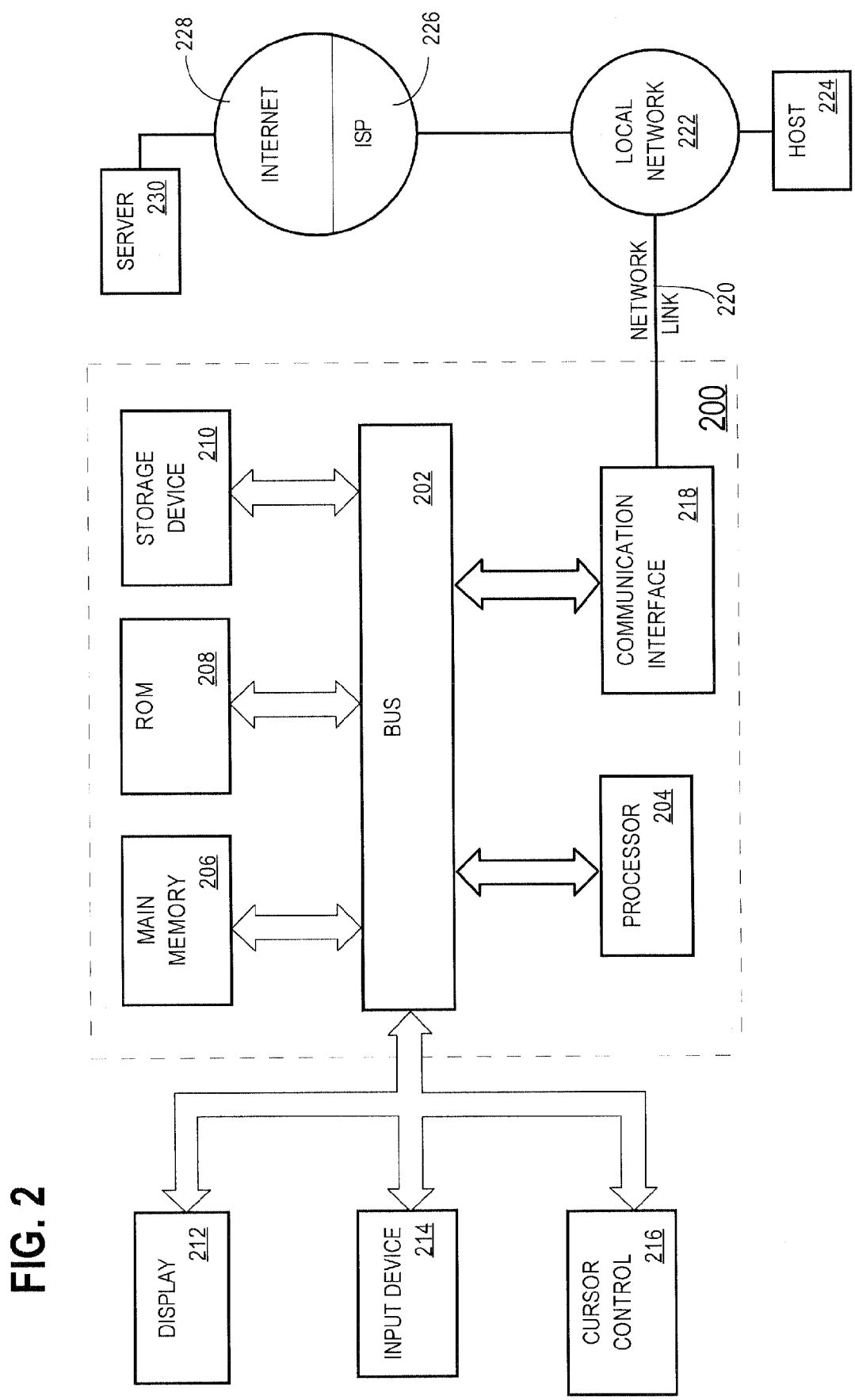
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving a data definition language command specifying a first operation to be performed with respect to a partition of a partitioned space;
        wherein the data definition language command specifies that the first operation is to be performed with respect to a referenced partition;
        wherein the referenced partition is not referenced by name in the data definition language command;
        wherein the referenced partition is instead referenced by at least a first value in a clause of the data definition language command that substitutes for the name;
    responsive to the data definition language command:
        selecting, from a plurality of partitions in the partitioned space, a first partition that has been assigned to store a set of values, the set of values including the first value, whereby the referenced partition is determined to be the first partition; and
        performing the first operation with respect to the first partition;
    wherein the method is performed by one or more computing devices.

2. The method of claim 1 wherein selecting the first partition further comprises determining that the first value is mapped to the first partition in a mapping of partitioning key values to partitions.

3. The method of claim 1 wherein selecting the first partition further comprises:
    determining that the first value belongs to the set of values; and determining that the first partition stores items for which the value of a first particular column of data belongs to the set of values.

4. The method of claim 1, wherein the partitioned space is a table.

5. The method of claim 1, wherein the partitioned space is a partition of a partition.

6. The method of claim 1 wherein the data definition language command indicates the first value using a PARTITION FOR(values) clause.

7. The method of claim 1 further comprising, prior to receiving the data definition language command, assigning the first partition a name not specified by any user.

8. A method comprising:
 requesting an operation to be performed with respect to a partition of a partitioned space in a database of a database system by sending a data definition language (DDL) command to the database system;
 wherein the data definition language command specifies that the first operation is to be performed with respect to a referenced partition;
 wherein the referenced partition is not referenced by name in the data definition language command;
 wherein the data definition language command instead references the referenced partition by at least a first value in a clause of the data definition language command that substitutes for the name;
 wherein sending the data definition language command to the database system causes the database system to:
  select, from a plurality of partitions in the partitioned space, a first partition that has been assigned to store a set of values, the set of values including the first value, whereby the referenced partition is determined to be the first partition; and
  perform the first operation with respect to the first partition;
 wherein the method is performed by one or more computing devices.

9. The method of claim 8, wherein the partitioned space is a table.

10. The method of claim 8, wherein the partitioned space is a partition of a partition.

11. The method of claim 1, wherein the data definition language command references the first partition using a plurality of values, including the first value, wherein each value of the plurality of values corresponds to a different column in a partitioning key for the partitioned space.

12. The method of claim 8, wherein the data definition language command references the first partition using a plurality of values, including the first value, wherein each value of the plurality of values corresponds to a different column in a partitioning key for the partitioned space.

13. One or more non-transitory computer-readable media storing instructions that, when executed by one or more processors, cause performance of:
 receiving a data definition language command specifying a first operation to be performed with respect to a partition of a partitioned space;
  wherein the data definition language command specifies that the first operation is to be performed with respect to an referenced partition;
  wherein the referenced partition is not referenced by name in the data definition language command;
  wherein the referenced partition is instead referenced by at least a first value in a clause of the data definition language command that substitutes for the name;
  selecting, from a plurality of partitions in the partitioned space, a first partition that has been assigned to store a set of values, the set of values including the first value, whereby the referenced partition is determined to be the first partition; and
  performing the first operation with respect to the first partition.

14. The one or more non-transitory computer-readable media of claim 13, wherein selecting the first partition further comprises determining that the first value is mapped to the first partition in a mapping of partitioning key values to partitions.

15. The one or more non-transitory computer-readable media of claim 13 wherein selecting the first partition further comprises:
 determining that the first value belongs to the set of values; and
 determining that the first partition stores items for which the value of a first particular column of data belongs to the set of values.

16. The one or more non-transitory computer-readable media of claim 13, wherein the partitioned space is a table.

17. The one or more non-transitory computer-readable media of claim 13, wherein the partitioned space is a partition of a partition.

18. The one or more non-transitory computer-readable media of claim 13 wherein the data definition language command indicates the first value using a PARTITION FOR(values) clause.

19. The one or more non-transitory computer-readable media of claim 13 wherein the instructions, when executed by the one or more processors, further cause performance of, prior to receiving the data definition language command, assigning the first partition a name not specified by any user.

20. The one or more non-transitory computer-readable media of claim 13, wherein the data definition language command references the first partition using a plurality of values, including the first value, wherein each value of the plurality of values corresponds to a different column in a partitioning key for the partitioned space.

21. One or more non-transitory computer-readable media storing instructions, when executed by one or more processors, cause performance of:
 requesting an operation to be performed with respect to a partition of a partitioned space in a database of a database system by sending a data definition language (DDL) command to the database system;
 wherein the data definition language command specifies that the first operation is to be performed with respect to a referenced partition;
 wherein the referenced partition is not referenced by name in the data definition language command;
 wherein the data definition language command instead references the referenced partition by at least a first value in a clause of the data definition language command that substitutes for the name;
 wherein sending the data definition language command to the database system causes the database system to:
  select, from a plurality of partitions in the partitioned space, a first partition that has been assigned to store a set of values, the set of values including the first value, whereby the referenced partition is determined to be the first partition; and
  perform the first operation with respect to the first partition.

22. The one or more non-transitory computer-readable media of claim 21, wherein the partitioned space is a table.

23. The one or more non-transitory computer-readable media of claim 21, wherein the partitioned space is a partition of a partition.

24. The one or more non-transitory computer-readable media of claim 21, wherein the data definition language command references the first partition using a plurality of values, including the first value, wherein each value of the plurality of values corresponds to a different column in a partitioning key for the partitioned space.

25. The method of claim 1, wherein the first operation specified by the data definition language is one of: dropping the partition, joining the partition with another partition, or splitting the partition.

26. The one or more non-transitory computer-readable media of claim 13, wherein the first operation specified by the data definition language command is one of: dropping the partition, joining the partition with another partition, or splitting the partition.

27. The method of claim 8, wherein the operation specified by the data definition language is one of: dropping the partition, joining the partition with another partition, or splitting the partition.

28. The one or more non-transitory computer-readable media of claim 21, wherein the operation specified by the data definition language command is one of: dropping the partition, joining the partition with another partition, or splitting the partition.

29. The method of claim 1, further comprising:
maintaining a partition mapping indicating, for any given partition of the partitioned space, a particular set of values which, if found in a particular column in the partitioned space, would be stored in the given partition;
wherein selecting the first partition comprises using the partition mapping to identify in which of the plurality of partitions the first value would be stored, if found in the particular column in the partitioned space.

30. The one or more non-transitory computer-readable media of claim 13, wherein the instructions, when executed by the one or more computer devices, further cause:
maintaining a partition mapping indicating, for any given partition of the partitioned space, a particular set of values which, if found in a particular column in the partitioned space, would be stored in the given partition;
wherein selecting the first partition comprises using the partition mapping to identify in which of the plurality of partitions the first value would be stored, if found in the particular column in the partitioned space.

31. The method of claim 1, wherein the clause of the data definition language command in which the first value is specified is a clause that, according to data definition language syntax, identifies the partition.

32. The one or more non-transitory computer-readable storage media of claim 13, wherein the clause of the data definition language command in which the first value is specified is a clause that, according to data definition language syntax, identifies the partition.

* * * * *

UNITED STATES PATENT AND TRADEMARK OFFICE
CERTIFICATE OF CORRECTION

Page 1 of 1

PATENT NO.         : 8,356,014 B2
APPLICATION NO.    : 11/764129
DATED              : January 15, 2013
INVENTOR(S)        : Shankar et al.

It is certified that error appears in the above-identified patent and that said Letters Patent is hereby corrected as shown below:

On Title page 2, item 56 in column 2, under "Other Publications", line 3, delete "101/610743/" and insert -- 101/b10743/ --, therefor.

In column 8, line 44, in Claim 21, delete "instructions," and insert -- instructions that, --, therefor.

In column 9, line 13, in Claim 25, delete "language" and insert -- language command --, therefor.

In column 9, line 23, in Claim 27, delete "language" and insert -- language command --, therefor.

Signed and Sealed this
Ninth Day of April, 2013

Teresa Stanek Rea
*Acting Director of the United States Patent and Trademark Office*